US008467515B2

(12) United States Patent
Czachor, Jr. et al.

(10) Patent No.: US 8,467,515 B2
(45) Date of Patent: Jun. 18, 2013

(54) SYSTEM AND METHOD FOR PROVIDING ENHANCED ANSWERING SERVICES IN A TIME-SENSITIVE MANNER

(75) Inventors: Martin Czachor, Jr., Newtown Square, PA (US); Kevin Czachor, West Chester, PA (US); Norman Franke, Garnet Valley, PA (US)

(73) Assignee: ASD Inc., Media, PA (US)

( * ) Notice: Subject to any disclaimer, the term of this patent is extended or adjusted under 35 U.S.C. 154(b) by 369 days.

(21) Appl. No.: 12/851,785

(22) Filed: Aug. 6, 2010

(65) Prior Publication Data

US 2012/0033799 A1    Feb. 9, 2012

(51) Int. Cl.
*H04M 3/42*    (2006.01)

(52) U.S. Cl.
USPC .................................. 379/214.01; 379/213.01

(58) Field of Classification Search
USPC .................. 379/265.02, 214.01, 213.01, 201, 379/67.1
See application file for complete search history.

(56) References Cited

U.S. PATENT DOCUMENTS

| | | | | |
|---|---|---|---|---|
| 4,629,831 A * | 12/1986 | Curtin et al. | ............. | 379/213.01 |
| 5,546,442 A * | 8/1996 | Foladare et al. | ............. | 455/417 |
| 5,943,397 A * | 8/1999 | Gabin et al. | ................. | 379/67.1 |
| 5,960,064 A * | 9/1999 | Foladare et al. | ........... | 379/88.26 |
| 6,798,868 B1 * | 9/2004 | Montgomery et al. | .... | 379/88.21 |
| 7,573,982 B2 * | 8/2009 | Breen et al. | ..................... | 379/45 |
| 2004/0018833 A1 * | 1/2004 | Praestgaard | .............. | 455/422.1 |

* cited by examiner

*Primary Examiner* — Amal Zenati
(74) *Attorney, Agent, or Firm* — Law Offices of Steven H. Meyer, LLC (57) ABSTRACT

A computing system of an answering service answers an incoming call from a calling party on behalf of a called party, and allows an agent to converse with the calling party relating to a purpose of the incoming call from the calling party. At a triggering point, a signal is received from the agent while the incoming call from the calling party is still in progress. The triggering point occurs when the agent determines that the calling party is calling regarding a predetermined urgent matter. Contact with the called party is commenced upon receiving the signal and communication between the calling party and the called party is effectuated while the incoming call from the calling party is still in progress.

14 Claims, 6 Drawing Sheets

SYSTEM AND METHOD FOR PROVIDING ENHANCED ANSWERING SERVICES IN A TIME-SENSITIVE MANNER

FIELD

The present disclosure relates to a business organization or the like that provides answering services, such as answering services for professionals such as doctors, lawyers, funeral directors, servicing representatives, and the like. More particularly, the present disclosure relates to such a business organization that provides such answering services in an especially time-sensitive manner. Accordingly, a client or the like calling a professional with an urgent matter is placed into contact with the professional by the business organization/ answering service as soon as possible.

BACKGROUND

In many business- or professional-related situations or the like, an age-old and recurring problem is effectuating contact between a professional or the like and a client or the like calling or otherwise attempting to contact the professional. Perhaps ideally, the client would place a telephone call or the like to the professional, the professional would answer the placed telephone call instantaneously if not within a matter of moments, the desired contact would thus be established, and the caller and professional could communicate regarding some matter of interest. Notably, however, most professionals are not always available to answer all calls instantaneously or even momentarily. For example, the professional simply may not want to answer calls, such as for example if on a vacation or at a family event, among other things, or the professional may be otherwise occupied by professional matters.

With regard to the latter case in particular, it may be that a doctor may be occupied by a medical matter and unavailable, or a lawyer may be in a legal conference from which she or he is not to be disturbed. Likewise, a funeral director may be attending to a first client while a second client is calling. In such a particular situation as well as others, it should be noted that not only is the funeral director otherwise occupied by the first client, but the nature of the funeral business is such that it would be considered to be particularly insensitive if not rude to answer the call from the second client while still attending to the first client.

Generally, it is to be recognized that a professional or the like may not always be immediately available to answer a call from a client, be it to a landline telephone line or a mobile telephone line or to such other communications device which may be available. As should be appreciated, such a situation can exist even when the client is calling regarding an urgent matter, such as a life-threatening matter or a matter that otherwise should be given immediate attention. Accordingly, it is known that such a professional may employ a business organization that provides answering services or the like (hereinafter, 'an answering service') to answer calls from clients when the professional is not immediately available.

As should be understood, a call to the professional is forwarded therefrom to the answering service by appropriate means when the professional is not available to answer such call or the like, and the answering service may perform a range of answering duties on behalf of the professional. For example, upon answering the call on behalf of the professional, the answering service may let the caller know when the professional is scheduled to be available, or may collect information so that the professional can return the call at an opportune time. Likewise, the answering service may perform an assessment regarding the nature of the call and based thereon may perform a range of actions. Thus, the answering service may determine that a relatively more serious matter requires more immediate action from the professional, in which case the answering service may attempt to contact the professional as soon as possible by appropriate means. Correspondingly, the answering service may determine that a relatively less serious matter requires less immediate action from the professional, in which case the answering service may only create a message for the professional to be collected thereby at a later time.

It is to be understood that in at least some professional situations, an answering service acts not only to answer calls on behalf of a professional, but also acts as what likely is the first contact a caller encounters regarding a called professional. Thus, the answering service may in fact be the initial public face of the professional to the caller, and if so may act to form the first impression by the caller of the professional. Put another way, if an initially calling caller is treated well by the answering service, and is otherwise made to feel comfortable and impressed by the answering service, such an initially calling caller is more likely to continue with further efforts to contact the professional and employ the goods and/or services of the professional. Conversely, if an initially calling caller is treated poorly by the answering service, or is otherwise made to feel uncomfortable or unimpressed by the answering service, such an initially calling caller may forego further efforts to contact the professional, and instead may call another professional.

The aforementioned funeral business or the like is especially relevant to such situation, in that a funeral caller initially calling a funeral director or the like probably or even likely has never previously contacted that funeral director, or any other funeral director for that matter, at least on a professional basis. Moreover, such funeral caller may have just suffered a loss of a relative or friend and also may be in an especially precarious frame of mind. Thus, and again, if the initially calling funeral caller is answered by an answering service on behalf of the funeral director, the answering service must take special care to treat the funeral caller with dignity, caring, and compassion, as is fitting and proper. Also, it is to be considered that the call from the funeral caller to the funeral director if properly handled likely will result in a relatively large monetary fee to the funeral director for funeral-related goods and services. Thus, the answering service must take special care to ensure that the funeral caller is not dissuaded or otherwise given reason to seek such funeral-related goods and service elsewhere.

Particularly with regard to funeral directors and the special needs thereof as outlined above, funeral answering services and the like have been developed to focus on and address same. Moreover, it should be understood that such funeral answering services are employed not only by funeral directors, but also by other funeral professionals that require similar heightened levels of dignity, caring, and compassion in their answering service needs. Such other funeral professionals may for example include funeral homes, cremation services, crematory facilities, cemetery and memorial parks, casket and coffin companies, livery services, trade embalmers, funeral transport services, coroners, monument companies, burial vault companies, grief and bereavement counselors, body and tissue donation services, pet cremation, burial and cemetery services, and the like.

Typically, upon a funeral business engaging an answering service to answer calls to the funeral business, the answering service engages the services of one or more telephone service providers or the like to effectuate forwarding of telephone calls or the like from the business to the answering service, particularly in a manner deemed necessary and/or advisable by the business. Such engaging and such forwarding services are generally known and need not be set forth herein in any detail other than that which is provided. Generally, the forwarding may occur on any appropriate basis, including the time of day, whether forwarding has been positively engaged or disengaged, whether the business has selected a particular call for forwarding, whether a call has rung a predetermined number of times, whether a phone or phone system of the business is off, or the like.

Notably, the answering service may answer a call on behalf of a particular funeral business according to a predetermined procedure or 'script' that has been established for the particular funeral business. As may be appreciated, the script can be quite involved, and can tend to cover a wide range of subjects, including the name and location of the deceased, the name, location, and telephone number of the caller, whether the caller is a family member or friend or a staff member at a nursing home or hospital or the like, where and when the funeral is to be performed, where and when burial or cremation is to be performed, required clergy, directions to establishments, parking availability and needs, handicap accessibility, available local florists and flower delivery services, and the like. In fact, such scripts can accommodate a wide range of scenarios and needs, and therefore can be quite extensive. Importantly, with the use of such a script, information can be collected from the funeral caller according to the script and entered into an appropriate database or the like for later retrieval and use, as is generally known.

In the prior art, the answering service would, based on such a script, collect all information as dictated according to the script, and then would terminate the call from the funeral caller, of course with appropriate dignity and consolation, as well as with an assurance that the funeral director/funeral business/funeral professional (hereinafter, 'funeral professional') would return the call. Notably, the answering service would then attempt to contact the funeral professional, but only upon the call being terminated. Typically, although by no means necessarily, the funeral professional can be contacted by way of a predetermined mobile telephone line, landline telephone line, pager, mobile electronic mail device, desktop electronic mail device, mobile electronic texting device, desktop electronic texting device, or a combination thereof, or the like.

Waiting until a call from a funeral caller is terminated to contact the funeral professional may be considered to be advantageous in that the answering service has collected a goodly amount of information on behalf of the funeral professional, and such information may then be forwarded to the funeral professional as a single package that may be in a more-or-less complete form. For example, the information may be forwarded as an electronic message to one or more of the aforementioned electronic devices of the funeral professional, at about when the call is terminated, when the funeral professional is actually contacted by the answering service, or the like. Alternately, if the funeral professional is contacted by the answering service by telephonic means, such information can be orally transmitted to the funeral professional. Note, though, that such oral transmission is prone to errors and can take quite some time if the information is relatively large.

Significantly, though, waiting until a call from a funeral caller is terminated to contact the funeral professional is disadvantageous in that the funeral caller, who again likely has just suffered a loss of a relative or friend and also likely is in an especially precarious frame of mind, would very much prefer to speak directly to the funeral professional rather than an answering service. Put plainly, the typical grieving funeral caller prefers and even expects to speak directly to the funeral professional as soon as possible to ensure that the funeral process as performed by such funeral professional is expeditiously begun. Perhaps more importantly, the typical grieving funeral caller also prefers and even expects to speak directly to the funeral professional as soon as possible in order to receive the psychological comforting that the funeral professional provides and has been trained to provide. After all, some of the most important functions the funeral professional performs are to help those who are still alive grieve the loss of the deceased.

Accordingly, a need exists for a system and method for providing enhanced answering services in a time-sensitive manner, particularly where the answering services are funereal in nature. In particular, a need exists for such a system and method where, upon recognizing that the caller is a funeral caller requiring professional services of a funeral professional for a deceased, contact with the funeral professional is automatically initiated, even before the call has been terminated. Further, a need exists for such a system and method where, upon establishing a connection with the funeral professional, the funeral professional can be introduced into the call while ongoing and can take over the call, the better to be able to directly comfort the grieving caller and also the better to be able to directly collect any additional information needed.

SUMMARY

The aforementioned needs are satisfied by a system and method performed by an answering service on behalf of a called party when a calling party places an incoming call to the called party and the called party is unable or unwilling to answer the incoming call directly. A computing system of the answering service answers the incoming call from the calling party on behalf of the called party by way of a first call connection of the computing system, identifies the called party based on the answered incoming call, identifies to an agent at a display associated with the computing system the identified called party, and allows the agent to converse with the calling party relating to a purpose of the incoming call from the calling party.

At a triggering point, a signal is received from the agent while the incoming call from the calling party is still in progress. The triggering point occurs when the agent determines that the calling party is calling regarding a predetermined urgent matter. Contact with the called party is commenced upon receiving the signal from the agent at the triggering point and while the incoming call from the calling party is still in progress. Upon establishing such contact with the called party, communication between the calling party and the called party is effectuated while the incoming call from the calling party is still in progress.

BRIEF DESCRIPTION OF THE DRAWINGS

The foregoing summary as well as the following detailed description of various embodiments of the present innovation will be better understood when read in conjunction with the appended drawings. For the purpose of illustrating the various embodiments of the innovation, there are shown in the drawings embodiments that are presently preferred. As should be understood, however, the innovation is not limited to the precise arrangements and instrumentalities shown. In the drawings.

DETAILED DESCRIPTION OF PREFERRED EMBODIMENTS

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a tip" includes a plurality of tips. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Example Computing Environment

Figure 1:
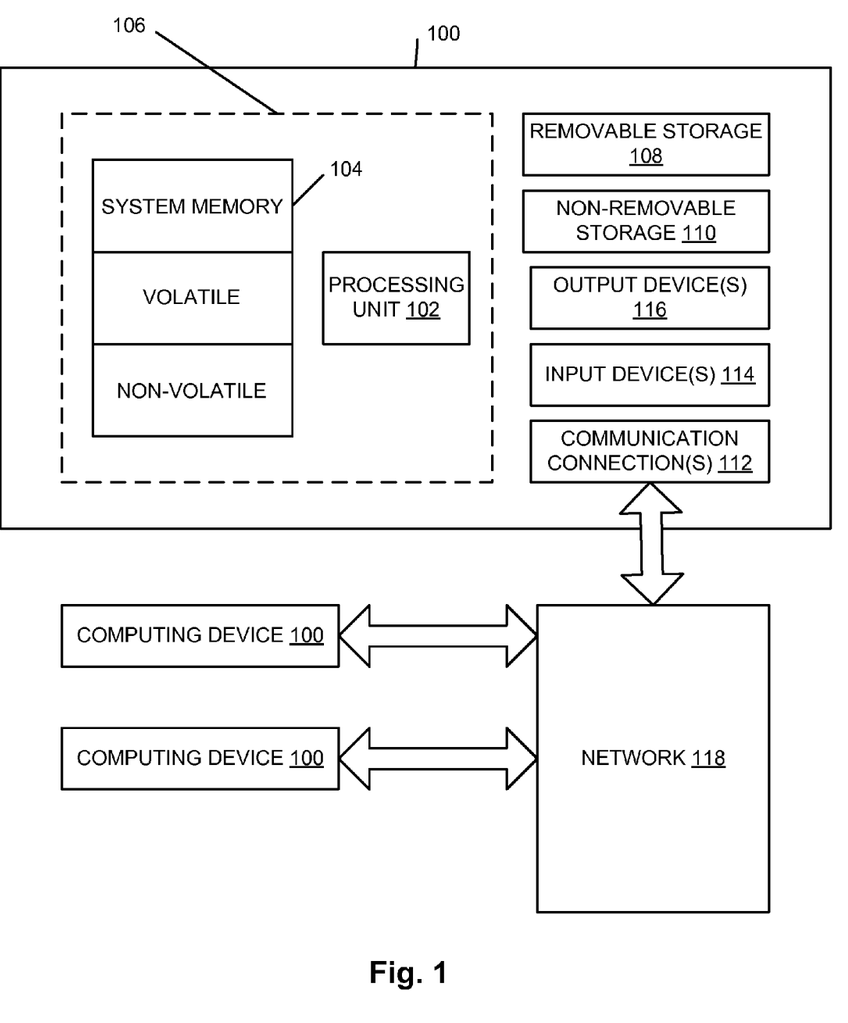
FIG. 1 is a block diagram of an example of a computing environment within which various embodiments of the present innovation may be implemented.

FIG. 1 is set forth herein as an exemplary computing environment in which various embodiments of the present invention may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features and functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable hardware media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other computer-readable hardware medium which can be used to store the desired information and which can accessed by computing device 100. Any such computer storage media may be part of computing device 100.

Computing device 100 may also contain communications connection(s) 112 that allow the device to communicate with other devices 100. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection (including VoIP), and wireless media such as acoustic, radio frequency (RF), infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like. Likewise, the network 118 may be such an external network.

Particularly in the case where the network 118 is an external network, such network 118 may be a digitally based network (including VoIP) for exchanging computer data among the devices 100, may be an audio and/or video network for exchanging audio and/or video data among the devices 100, or the like. Thus, it may be that the network 118 may be a public switched telephone network for landline telephone communications, a mobile switching center for wireless telephone communications, a paging network for distributing paging information, a private multimedia network for establishing videoconferencing, or the like. Thus, it should be appreciated, that one or more of the computing devices 100 that are shown to the left of the network 118 in FIG. 1 may be a mobile telephone, a landline telephone, a pager, a mobile electronic mail device, a desktop electronic mail device, a mobile electronic texting device, a desktop electronic texting device, or a combination thereof, or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Professional Answering Service

Figure 2:
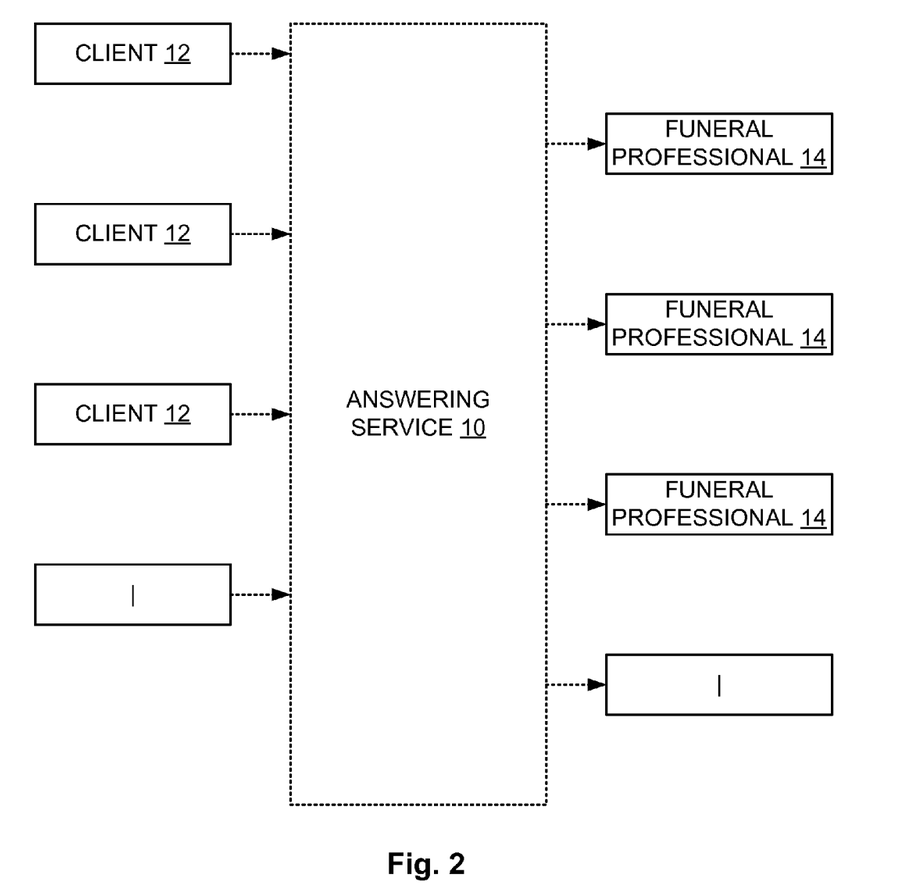
FIG. 2 is a block diagram showing a professional answering service provided to answer calls or the like from clients to professionals or the like in the event that the professionals are not willing or able to answer the calls.

Turning now to FIG. 2, it is seen that a professional answering service 10 is provided to answer each of one or more calls or the like from each of one or more clients 12 or the like to each of one or more professionals 14 or the like in the event that a particular professional 14 is not willing or able to answer a particular call from a particular client 12. Typically, although not necessarily, the answering service 10 is operated by a business organization that provides answering services or the like on behalf of multiple professionals 14. As was alluded to above, each client 12 and each professional 14 may be any appropriate respective client and professional without departing from the spirit and scope of the present innovation. Thus it may be that a particular professional 14 is a doctor, a lawyer, a service professional, a funeral director, or the like, among other things, and a particular client 12 calling to the professional 14 may require the professional services thereof, perhaps on an urgent basis.

Likewise, the reason why the professional 14 does not answer a particular call may be most any reason without departing from the spirit and scope of the present innovation. For example, the professional 14 simply may not want to answer calls, such as for example if on a vacation or at a family event, among other things, or the professional 14 may be otherwise occupied by professional matters.

Presumptively, the call to the professional 14 from the client 12 is of a telephonic nature, at least for purposes of disclosing the present innovation in the present disclosure. Thus, it may be that the client 12 is employing a landline telephone or a mobile telephone (a device 100 of FIG. 1, e.g.), and is calling to a landline telephone or mobile telephone of the professional 14 (also a device 100 of FIG. 1, e.g.). Notably, though, the call to the professional 14 from the client 12 could be of some other nature without departing from the spirit and scope of the present innovation. For example, it may be that the client 12 is employing a digital electronic mail device or a digital texting device (again, a device 100 of FIG. 1, e.g.), and is addressing a digital electronic mail device or a digital texting device (once again, a device 100 of FIG. 1, e.g.) of the professional 14.

Particularly in the case where the call is telephonic in nature, and as seen in FIG. 2, the call from the client 12 to the professional 14 is forwarded therefrom to the answering service 10 by appropriate means that have already been established in a generally known manner. Typically, and as was alluded to above, upon the professional 14 engaging the answering service 10 to answer calls on behalf of such professional 14, the answering service 10 communicates with one or more telephone service providers or the like to effectuate such forwarding. As should be understood, the forwarding may be performed according to any appropriate basis, including the time of day, whether forwarding has been positively engaged or disengaged, whether the business has selected a particular call for forwarding, whether a call has rung a predetermined number of times, whether a phone or phone system of the business is off, or the like. In any case, the call from the client 12 to the professional 14 is in fact answered by the answering service 10 on behalf of the professional 14.

Funeral Professional

Although the professional 14 of the present innovation may be most any professional, it is to be appreciated that the present innovation has special relevance to funeral professionals 14, including not only funeral directors but also related professionals and services such as funeral homes, cremation services, crematory facilities, cemetery and memorial parks, casket and coffin companies, livery services, trade embalmers, funeral transport services, coroners, monument companies, burial vault companies, grief and bereavement counselors, body and tissue donation services, pet cremation, burial and cemetery services, and the like. Notably, such funeral professionals 14 share a common need for a heightened level of dignity, caring, and compassion in connection with the services provided thereby to a client 12, as well as the services provided on their behalf to the client 12 by the answering service 10.

For example, a funeral director attending to a first client 12 is expected to devote an especially heightened level of care and compassion to such first client 12, even when a second client 12 is calling such funeral director. Nevertheless, the second client 12 also should expect the same heightened level of care and compassion. Thus, the dilemma is whether to interrupt the first client 12 to answer the second client 12, or to ignore the second client 12, either of which may be considered to be particularly insensitive if not rude. Moreover, the dilemma may be compounded in the case where the second client 12 is an initial caller initially calling regarding obtaining funeral services for a deceased, and ignoring same would result in the second client 12 obtaining funeral services elsewhere, thus representing a substantial monetary loss to the funeral professional 14.

In such an instance, the answering service 10 in answering the call from the initially calling second client 12 on behalf of the funeral professional 14 allows same to at least somewhat satisfy the needs of the second client 12 for the moment, and helps to prevent the second client 12 from obtaining funeral services elsewhere. More generally, the answering service 10 can very likely be the first contact any client 12 encounters regarding the called funeral professional 14, and in so doing is the initial public face of the funeral professional 14 to such client 12 and acts to form the first impression by the client 12 of the funeral professional 14. Thus, the funeral professional 14 should expect if not require that the answering service 10 treat each calling client 12 well, and otherwise make such client 12 feel comfortable and impressed by the answering service 10, so that the calling client 12 is more likely to continue with further efforts to contact the funeral professional 14 and employ the services thereof.

As might be appreciated, performing such a task is especially difficult for the answering service 10 if the calling client 12 has just suffered a loss of a relative or friend and is therefore in an especially precarious frame of mind. Accordingly, the answering service 10 may be expected to employ especially well-trained agents to answer calls from clients 12 to funeral professionals 14, where the agents are selected based at least in part on being compassionate, caring, soothing, and attentive, among other things.

Nevertheless, it is especially important to remember that a calling client 12 and especially a client 12 initially calling regarding a deceased wishes to speak directly to the funeral professional 14 as soon as possible. In particular, and as was alluded to above, no matter how well-trained the agents may be at the answering service 10, the calling client 12 may have just suffered a loss of a relative or friend and also may be in an especially precarious frame of mind, and would very much prefer to speak as soon as possible with the funeral professional 14 rather than an answering service 10, both to ensure that the funeral process as performed by such funeral professional 14 is expeditiously begun, and also to receive the psychological comforting that the funeral professional 14 provides and has been trained to provide.

Time-Sensitive Answering Service

Figure 3:
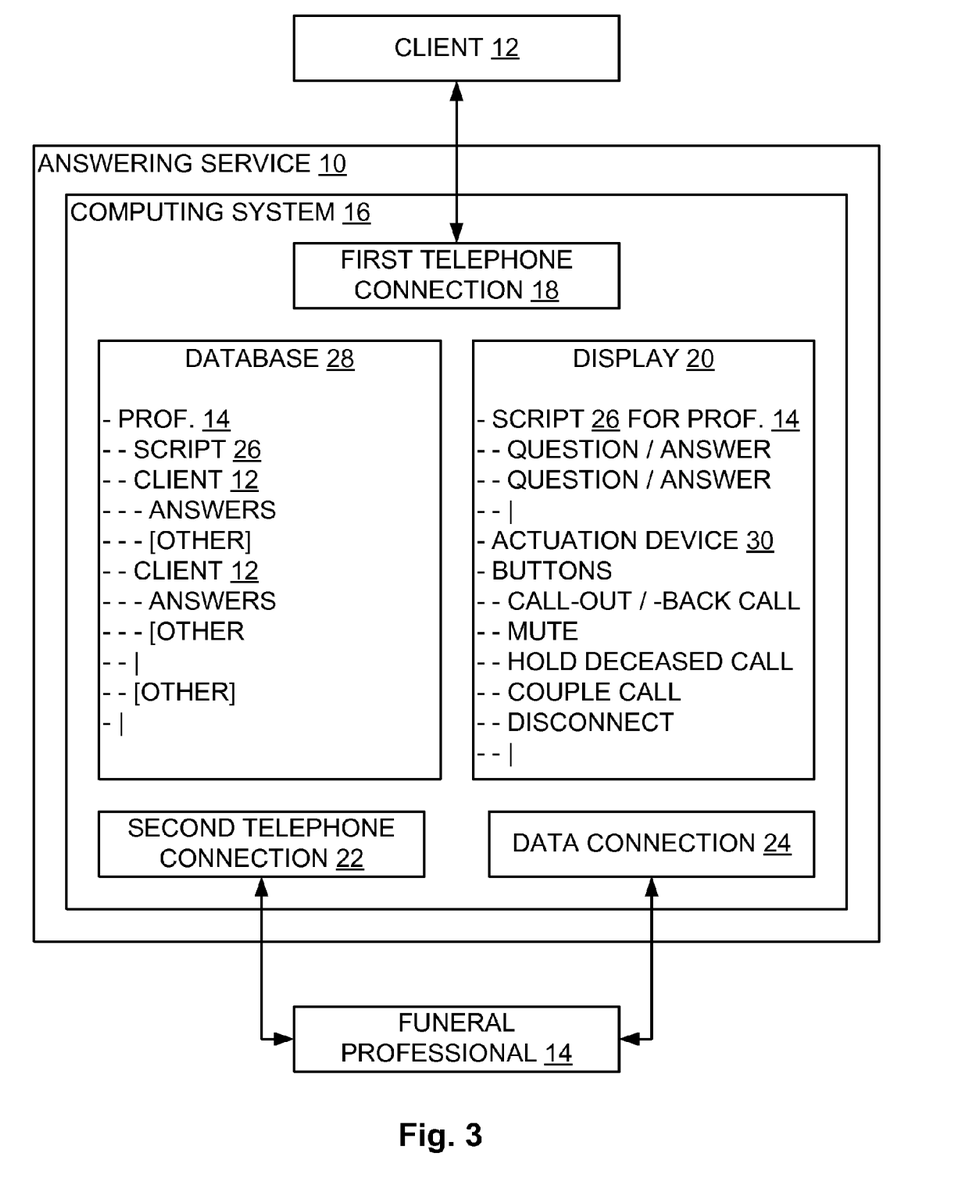
FIG. 3 is a block diagram of a computing system employed to answer a call from the client of FIG. 2 to the funeral professional of FIG. 2 as forwarded to the answering service of FIG. 2 in accordance with various embodiments of the present innovation.

Accordingly, and turning now to FIG. 3, it is seen that in various embodiments of the present innovation, a call from a client 12 to a funeral professional 14 as forwarded to an answering service 10 is answered by an individual agent associated with the answering service 10 with the use of a computing system 16 instantiated by or on behalf of the answering service 10. Notably, such a computing system 16 as instantiated includes a mechanism for initiating contact with the funeral professional 14 as soon as the agent thereof who is answering the call determines that the calling client 12 is initially calling regarding a deceased or other urgent matter.

As seen in FIG. 3, the computing system 16 is in the nature of the computing device 100 on the top part of FIG. 1. Here, it is to be appreciated that the computing system 16 may among other things include a first telephone connection 18 or the like for receiving the forwarded call from the client 10, a display 20 or the like upon which is shown various items, a second telephone connection 22 or the like for outgoing calls and automated voicemail dispatch or the like, and a data connection 24 or the like for outgoing data messages or the like, perhaps in the nature of electronic mail or a text message as will be set forth in more detail below.

As was noted above, the agent at the computing system 16 of the answering service 10 may answer a particular forwarded call from a client 10 on behalf of a particular funeral professional 14 according to a predetermined procedure or 'script 26' that has been established for the particular funeral professional 14. Accordingly, and now referring also to FIG. 4, as an initial matter the particular call is received on the first telephone connection 18 of the computing system 16 (401, FIG. 4), is identified by the system 16 as being for a particular funeral professional 14 (403), and based thereon the system 16 obtains and runs the corresponding script 26 (405), perhaps from a local or remote database 28 (FIG. 3). As may be appreciated, the system may identify the particular funeral professional 14 for the forwarded call as at 403 in any appropriate manner, such as for example based on a caller ID, DNIS (Dialed Number Identification System), or other information associated with the forwarded call. Such identifying is known or should be apparent to the relevant public and therefore need not be set forth herein in any detail other than that which is provided.

Figure 4:
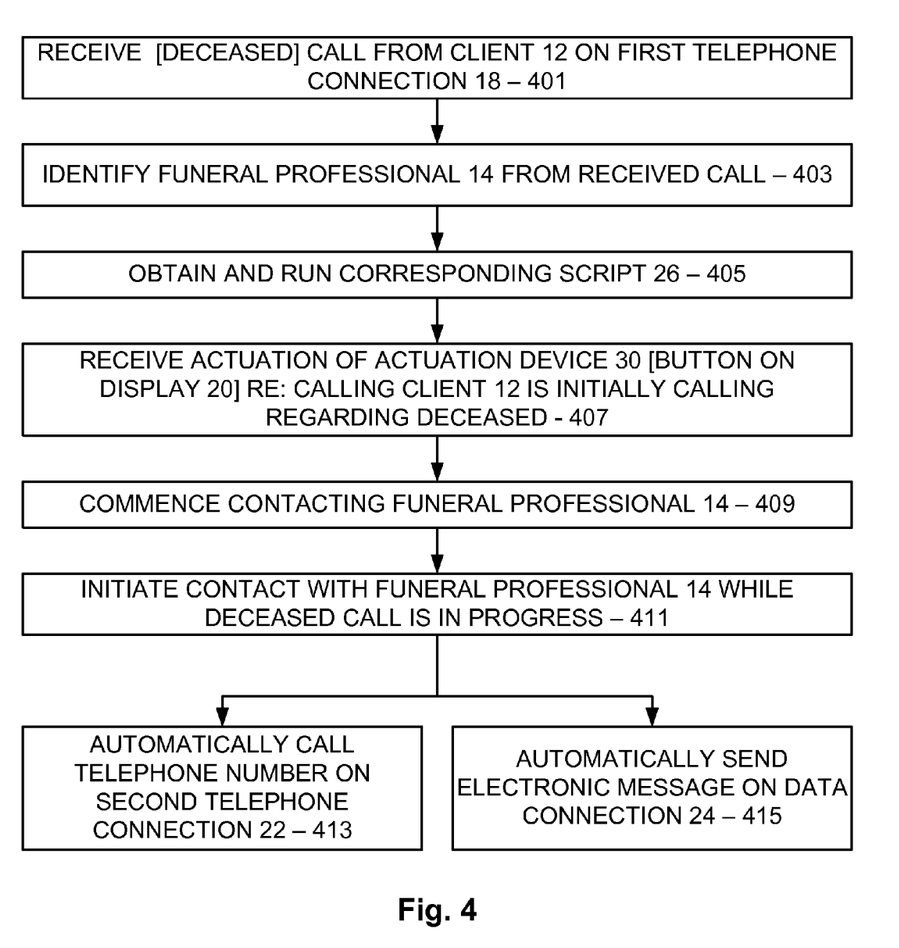
FIGS. 4-6 are flow diagrams showing actions performed by the computing system of FIG. 3 in accordance with various embodiments of the present innovation.

As may be appreciated, the obtained and run script 26 as at 405 is in an electronic form, and may have any appropriate structure. Typically, although not necessarily, the script 26 includes a number of questions that are displayed on the display 20 of the computing system 16, the agent asks the questions to the calling client 12 and enters corresponding answers into appropriate pre-defined spaces in the display 20, and the entered answers can be stored in a record of appropriate form in the database 28 or elsewhere. As should be understood, the questions and answers relate to ferreting out the purpose of the call from the calling client 12.

The questions may be displayed and the answers collected individually or in groups, and the script 26 may include branching points where different answers to a previous question result in different next questions, among other things. As was alluded to above, the script 26 can be quite extensive so as to accommodate a wide range of subjects, including the general nature of the call, the name and location of the deceased, the name, location, and telephone number of the calling client 12, whether the calling client 12 is a family member or friend or a staff member at a nursing home or hospital or the like, whether services have been prearranged, personal information on the deceased including date of birth, date and time of death, the name and telephone number of any attending doctor, required clergy, directions to establishments, parking availability and needs, handicap accessibility, available local florists and flower delivery services, and the like. Note here that at least some of such information can possibly be collected automatically. For example, the name, location, and telephone number of the calling client 12 may be obtained from known sources such as caller ID or other similar information. In such a circumstance, it may be that the corresponding question is automatically skipped, or that the information is confirmed by the agent.

As was noted above, the agent could, based on such a script 26, collect all information as dictated according to the script 26, and then could terminate the call from the calling client 12, and then could attempt to contact the funeral professional 14 after the call is terminated. As should be understood, the funeral professional 14 typically can be contacted by way of a predetermined mobile telephone line, landline telephone line, pager, mobile electronic mail device, desktop electronic mail device, mobile electronic texting device, desktop electronic texting device, or a combination thereof, or the like. Upon contacting the funeral professional 14 or as part of contacting the funeral professional 14, then, the agent would transmit thereto at least some of the corresponding record in the database 26 so that the funeral professional 14 could call back the calling client 12. Such transmitting may be performed orally if over a telephone line or the like, or electronically if by way of an electronic message or the like. If electronically, a return receipt may be required to confirm that the funeral professional 14 has received the transmission.

However, and as was pointed out above, waiting until the call is terminated to contact the funeral professional 14 is disadvantageous in that the calling client 12 is made to wait to speak directly to the funeral professional 14, which is likely preferred. Also, the calling client 12 while being made to wait may have second thoughts about engaging the services of the funeral professional 14, and instead may decide to seek such services elsewhere.

Accordingly, and in various embodiments of the present innovation, while the corresponding script is being run as at 405, during which questions are displayed to the agent on the display 20 and answers are collected and stored in the database 28, the agent is also given an option to have the computing system 16 immediately commence contacting the funeral professional 14 at any triggering point when the agent determines that the calling client 12 is initially calling regarding a deceased (409). As may be appreciated, the agent may determine that a calling client 12 is initially calling regarding a deceased in any appropriate manner without departing from the spirit and scope of the present innovation, perhaps with guidance if not training and instructions from the answering service 10.

Nevertheless, it may be expected that such a calling client 12 initially calling regarding a deceased is a caller who has not previously called regarding a particular deceased and is therefore calling to initiate the use of funeral services provided by the called-to funeral professional 14 with regard to such particular deceased, or at least to inquire regarding such use. Perhaps parenthetically, it may also be expected that in at least some instances the calling client 12 is not especially clear that same is in fact initially calling regarding a deceased, for example in cases where the calling client 12 is distraught or overcome with grief, or in cases where the calling client 12 is suffering from other diminished mental capacity. Thus, the training of the agent may focus on such aspects in particular when deciding whether the calling client 12 is in fact initially calling regarding a deceased.

In various embodiments of the present innovation, and as seen in FIG. 3, the option to commence contacting the funeral professional is provided by way of an actuation device 30 on the display 20, which may be a button labeled 'Get Funeral Professional Now' or the like. Thus, such actuation device 30 is actuated by the agent (407) by way of a displayed cursor and associated mouse, by way of touching if the display 20 is a touch display, by way of a keystroke or keystroke sequence on an associated keyboard of the computing system 16, or the like. Alternately, the actuation device 30 may be separate from the display 20, and in particular may be hardware on an associated keyboard of the computing system 16 or some other related structure, and/or software actuated by such software.

Upon the agent actuating the actuation device 30 as at 407 and the computing system receiving same as at 409, and in various embodiments of the present innovation, the computing system 16 initiates contact with the funeral professional 14 immediately, or at least as soon as is practicable, while the incoming call from the calling client 12 (hereinafter, 'the deceased call') is still in progress (411). That is to say, the contact is initiated prior to the agent reaching the end of the script. Thus, in the meantime, the computing system may continue running the script as at 405 so that the agent can continue gathering information from the calling client 12.

As may be appreciated, the method of contact employed by the system 16 as at 411 may be any appropriate method, and may be set forth in the corresponding script 26 or a related document from the database 28 or the like. As presently envisioned, the method of contact may involve a telephone number of the funeral professional 14 (perhaps associated with a mobile telephone of the funeral professional 14), in which case the computing system 16 automatically calls to such telephone number by way of the second telephone connection 22 while the deceased call is still in progress (FIG. 3) (413), or may involve an electronic mail or text address of the funeral professional 14 (perhaps associated with a pager, a personal data assistant, or the like of the funeral professional 14), in which case the computing system 16 automatically sends an electronic mail message or a text message to such address by way of the data connection 24, again while the deceased call is still in progress (FIG. 3) (415), or may involve both.

Figure 5:
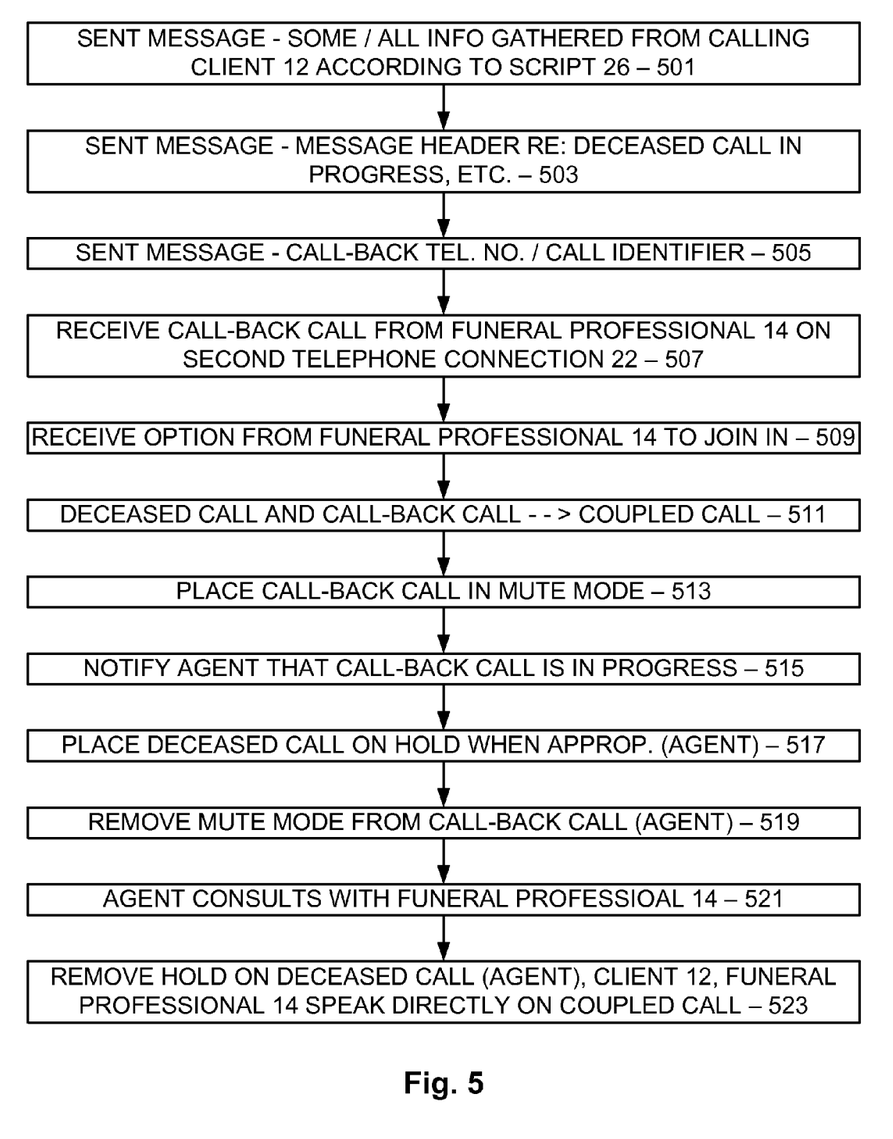

If the computing system 16 automatically sends an electronic mail message or a text message to an address of the funeral professional 14 by way of the data connection 24 (FIG. 3) (415), and turning now to FIG. 5, it may be that the automatically sent message includes some or all of the information thus far gathered by the agent from the calling client 12 according to the corresponding script 26 (501). Additionally, it may be that the sent message includes an appropriate message header to be initially seen by the funeral professional 14, such as for example that the deceased call is in progress, and perhaps other information (503). In various embodiments of the present innovation, the sent message also includes a call-back telephone number by which the funeral professional 14 can call in by way of the second telephone connection 22 (hereinafter, 'the call-back call'), and if need be a call identifier that may be needed to identify the deceased call (505). Note here that including such a call-back telephone number and/or such a call identifier may not be necessary if, for example, the funeral professional 14 has a dedicated call-back telephone number, in which case the computing system 16 can recognize the funeral professional 14 thereby. However, such a call identifier in particular may be needed if it is anticipated that the funeral professional 14 would be involved in several deceased calls simultaneously.

As should be appreciated, with the call-back telephone number and perhaps the call identifier, the funeral professional 14 may then initiate the call-back call, which would then be received and answered by the computing system 16 by way of the second telephone connection 22 (507). The computing system 16 identifies the funeral professional 14 on the call-back call to the deceased call by appropriate means and, in various embodiments of the present innovation, gives the funeral professional 14 the option to decide whether to join in at all, or perhaps to merely monitor the deceased call without joining in (509). Such an option to monitor may be implemented by way of a vocalized menu system or the like, as may be appreciated. As may be appreciated, despite the great sensitivity and compassion required, there are also times when the funeral professional 14 knows that immediate involvement is not needed and/or advisable. For example, it may be that the deceased call was expected and plans have already been made to address same, among other things.

Presuming, however, that the funeral professional 14 does in fact wish to join in to the deceased call, and in various embodiments, the computing system 16 communicatively couples the deceased call and the call-back call (hereinafter, 'the coupled call' (511) in a manner that is generally known, perhaps with a corresponding appropriate vocalized message to the funeral professional 14. However, in doing so, the computing system 16 initially places the call-back call in a mute mode so that the funeral professional 14 can hear the deceased call but cannot be heard in the deceased call (513). Thus, the funeral professional 14 on the call-back call can listen to the deceased call while in progress by way of the coupled call, and is not suddenly and perhaps jarringly present in such deceased call. In addition, the computing system 16 notifies the agent that the call-back call is in progress (515), perhaps by way of an appropriate highlighted button or a message in the display 20 (FIG. 3). Thus, the agent can then notify the calling client 12 that the funeral professional 14 may be currently available to speak with such calling client 12.

It may be that the agent thereafter removes the mute mode from the call-back call to allow the calling client 14 and funeral professional 14 to speak directly by way of the coupled call (519), again perhaps by way of appropriate highlighted buttons in the display 20 (FIG. 3). However, the agent has already gathered information which may be of immediate interest to the funeral professional 14 based on the questions and answers from the aforementioned script 26. Thus, it may be that prior to removing the aforementioned mute mode, the agent politely places the deceased call on hold when appropriate (517), once more perhaps by way of an appropriate highlighted button in the display 20 (FIG. 3), then removes such mute mode from the call-back call as at 519, consults with the funeral professional 14 regarding the status of the deceased call and any gathered information not yet delivered to the funeral professional 14 (521), then removes the hold on the deceased call, still once more perhaps by way of an appropriate highlighted button in the display 20 (FIG. 3), introduces the calling client 12 and the funeral professional 14 to each other, and allows both to speak directly to each other by way of the coupled call (523).

Notably, by giving the gathered information thereof to the funeral professional 14 as at 501 and 521, the calling client 12 need not repeat same. Moreover, the funeral professional 14 with such information can proceed to comfort the calling client 12 that much more quickly inasmuch as the administrative details may have already been dealt with and communicated to the funeral professional 14. Also notably, once the calling client 12 and the funeral professional 14 are introduced to each other and speaking by way of the coupled call, the agent need not necessarily be involved in either the deceased call or the call-back call, and therefore may disconnect out of the coupled call, still once more again perhaps by way of an appropriate highlighted button in the display 20. Alternately, the agent can stay in the coupled call to take notes on behalf of the funeral professional 14, and can then deliver the notes to such funeral professional 14, perhaps by way of an electronic mail or text message or the like.

If the computing system 16 automatically calls to a telephone number of the funeral professional 14 by way of the second telephone connection 22 as at 413 of FIG. 4, the process is similar to that of FIG. 5. In particular, and turning now to FIG. 6, it may also be that the automatic call includes some or all of the information thus far gathered by the agent from the calling client 12 according to the corresponding script 26 (601), although such information would likely be abbreviated due to the oral nature of the telephone. Note here that some of such information may be included with caller ID information that is provided with the automatic call. Here, no call-back telephone number or call identifier would be needed as the computing system 16 initiated the outgoing call out to the funeral professional 14 by way of the second telephone connection 22 (hereinafter, 'the call-out call').

Figure 6:
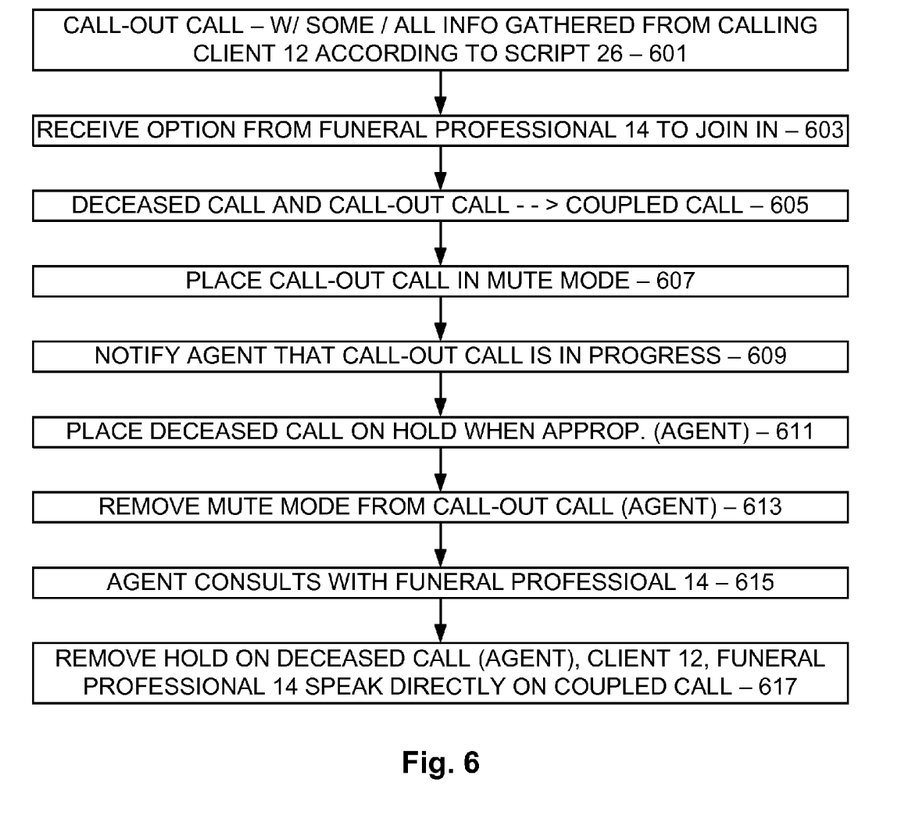

Upon the funeral professional 14 receiving the call-out call and receiving the information at 601, such funeral professional 14 may then be given the option to decide whether to join in at all or perhaps to merely monitor the deceased call without joining in as before at 509 (603). Thus, the computing system 16 would receive a selected option from the funeral professional 14 and act accordingly in a manner that should be understood. Presuming, again that the funeral professional 14 does in fact wish to join in to the deceased call, and in various embodiments, the computing system 16 communicatively couples the deceased call and the call-out call (hereinafter, 'the coupled call' in a manner similar to that of 511 (605). As before, the computing system 16 initially places the call-out call in a mute mode so that the funeral professional 14 can hear the deceased call but cannot be heard in the deceased call (607). Thus, and again, the funeral professional 14 on the call-out call can listen to the deceased call while in progress by way of the coupled call, and is not suddenly and perhaps jarringly present in such deceased call. As with 515, the computing system 16 also notifies the agent that the call-out call is in progress (609), perhaps by way of an appropriate highlighted button or a message in the display 20 (FIG. 3). Thus, the agent can likewise notify the calling client 12 that the funeral professional 14 may be currently available to speak with such calling client 12.

Similar to before, it may be that the agent thereafter removes the mute mode from the call-out call to allow the calling client 14 and funeral professional 14 to speak directly by way of the coupled call (613), again perhaps by way of appropriate highlighted buttons in the display 20 (FIG. 3). However, and again, the agent has already gathered information which may be of immediate interest to the funeral professional 14 based on the questions and answers from the aforementioned script 26. In the telephone case of FIG. 6, however, it is likely that the funeral professional 14 has not had much if any information provided as yet, and accordingly it is more likely that the agent must spend some time delivering such information to the funeral professional 14. Accordingly, prior to removing the aforementioned mute mode, the agent politely places the deceased call on hold when appropriate (611), once more perhaps by way of an appropriate highlighted button in the display 20 (FIG. 3), then removes such mute mode from the call-out call as at 613, consults with the funeral professional 14 regarding the status of the deceased call and the gathered information not yet delivered to the funeral professional 14 (615), then removes the hold on the deceased call, still once more perhaps by way of an appropriate highlighted button in the display 20 (FIG. 3), introduces the calling client 12 and the funeral professional 14 to each other, and allows both to speak directly to each other by way of the coupled call (617).

Once more, by giving the gathered information thereof to the funeral professional 14 as at 601 and 615, the calling client 12 need not repeat same. Also, once the calling client 12 and the funeral professional 14 are introduced to each other and speaking by way of the coupled call, the agent need not necessarily be involved in either the deceased call or the call-out call, and therefore may disconnect out of the coupled call, still once more again perhaps by way of an appropriate highlighted button in the display 20. Alternately, the agent can again stay in the coupled call to take notes on behalf of the funeral professional 14, and can then deliver the notes to such funeral professional 14, perhaps by way of an electronic mail or text message or the like.

CONCLUSION

The programming believed necessary to effectuate the processes performed by the computing system 16 in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, a method and mechanism are set forth for providing enhanced answering services in a time-sensitive manner, particularly where the answering services are funereal in nature. Upon recognizing that a calling client 12 is a funeral caller initially calling regarding professional services of a funeral professional 14 for a deceased, the answering service 10 automatically initiates contact with the funeral professional 14, even before the deceased call has been terminated. Upon establishing a connection with the funeral professional 14, be it a call-out or call-back call, such funeral professional 14 can be introduced to the calling client 12 by way of a coupled call and can take over from the agent, the better to be able to directly comfort the grieving calling client 12 and also the better to be able to directly collect any additional information needed.

It should be appreciated that changes could be made to the embodiments described above without departing from the innovative concepts thereof. For example, although the present innovation is set forth primarily in terms of a funeral business or the like, such innovation may also be practiced by any other appropriate type of business or called party that would prefer to employ enhanced answering services to calling clients 12 or other calling parties so as to be in direct contact with such calling clients 12 or other calling parties in an expedited manner when an urgent situation arises. Moreover, although the present innovation is set forth primarily in terms of telephonic calls or the like from initial callers, such innovation may also be practiced by in connection with any other appropriate type of communications medium and other types of callers, perhaps with suitable modification. Likewise, although the present innovation is set forth with reference to the use of a script 26, such script 26 need not necessarily be employed, in which case the call may be answered in a free-form manner, with suitable modification. It should be understood, therefore, that this innovation is not limited to the particular embodiments disclosed, but it is intended to cover modifications within the spirit and scope of the present innovation as defined by the appended claims.

The invention claimed is:

1. A method performed by an answering service on behalf of a predetermined called party when a calling party places an incoming call to the called party and the called party is unable or unwilling to answer the incoming call directly, the method being performed by a computing system of the answering service and comprising:
    determining that the calling party has placed the incoming call to the predetermined called party and that the incoming call has been forwarded to the answering service because the called party is not immediately available to the calling party; answering the forwarded incoming call from the calling party on behalf of the called party by way of a first call connection of the computing system; identifying the called party based on the incoming call; identifying to an agent at a display associated with the computing system the identified called party and allowing the agent to converse with the calling party relating to a purpose of the incoming call from the calling party; receiving a signal from the agent at a triggering point while the incoming call from the calling party is still in progress, the triggering point being when the agent determines that the calling party is calling regarding a predetermined urgent matter; commencing contact with the called party upon receiving the signal from the agent at the triggering point and while the incoming call from the calling party is still in progress; and establishing such contact with the called party and effectuating communication between the calling party and the called party while the incoming call from the calling party is still in progress,
    the computing system establishing contact with the called party by automatically placing an outgoing call to a telephone number of the called party by way of a second telephone connection of the computing system, the method further comprising: receiving an answer to the placed outgoing call from the called party by way of the second telephone connection of the computing system; communicatively coupling the incoming call and the placed outgoing call; placing the placed outgoing call in a mute mode so that the called party can hear but cannot be heard; notifying the agent that the coupled outgoing call is in progress so that the agent can then notify the calling party that the called party may be currently available to speak with the calling party; receiving a signal from the agent to place the incoming call on hold; receiving a signal from the agent to remove the mute mode from the outgoing call so that the agent can then consult with the called party regarding a status of the incoming call and the gathered answers; and receiving a signal from the agent to remove the hold on the incoming call to allow the calling party and called party to speak directly by way of the coupled calls.

2. The method of claim 1 wherein the call is a telephone call.

3. The method of claim 1 wherein the called party is a funeral professional and the calling party is a client calling the funeral professional regarding obtaining funeral services for a deceased.

4. The method of claim 1 wherein the called party is a funeral professional, the calling party is a client calling the funeral professional regarding obtaining funeral services for a deceased, and the triggering point is when the agent determines that the calling party is initially calling regarding the deceased.

5. The method of claim 1 wherein the received signal from the agent at the triggering point is provided by way of an actuation device on the display actuated by the agent.

6. The method of claim 1 further comprising:
identifying the called party based on the answered incoming call;
obtaining a script associated with the identified called party from a database associated with the computing system;
running the obtained script to display questions to an agent at a display associated with the computing system and to gather answers from the calling party based on the displayed questions, the questions and answers relating to a purpose of the incoming call from the calling party,
the received signal from the agent at the triggering point being received prior to an ending of the script.

7. The method of claim 1 further comprising receiving a signal from the agent to disconnect out of the coupled calls once the calling party and the called party are speaking by way of the coupled calls.

8. A method performed by an answering service on behalf of a predetermined called party when a calling party places an incoming call to the called party and the called party is unable or unwilling to answer the incoming call directly, the method being performed by a computing system of the answering service and comprising: determining that the calling party has placed the incoming call to the predetermined called party and that the incoming call has been forwarded to the answering service because the called party is not immediately available to the calling party; answering the forwarded incoming call from the calling party on behalf of the called party by way of a first call connection of the computing system; identifying the called party based on the incoming call; identifying to an agent at a display associated with the computing system the identified called party and allowing the agent to converse with the calling party relating to a purpose of the incoming call from the calling party; receiving a signal from the agent at a triggering point while the incoming call from the calling party is still in progress, the triggering point being when the agent determines that the calling party is calling regarding a predetermined urgent matter; commencing contact with the called party upon receiving the signal from the agent at the triggering point and while the incoming call from the calling party is still in progress; and establishing such contact with the called party and effectuating communication between the calling party and the called party while the incoming call from the calling party is still in progress, the computing system establishing contact with the called party by automatically sending an electronic message to an address of the called party by way of a data connection of the computing system, the message including a call-back telephone number by which the called party can place a call-back call to a second telephone connection of the computing system, the method further comprising: receiving an answer to the placed outgoing call from the called party by way of the second telephone connection of the computing system; communicatively coupling the incoming call and the placed outgoing call; placing the placed outgoing call in a mute mode so that the called party can hear but cannot be heard; notifying the agent that the coupled call-back call is in progress so that the agent can then notify the calling party that the called party may be currently available to speak with the calling party; receiving a signal from the agent to place the incoming call on hold; receiving a signal from the agent to remove the mute mode from the outgoing call so that the agent can then consult with the called party regarding a status of the incoming call and the gathered answers; and receiving a signal from the agent to remove the hold on the incoming call to allow the calling party and called party to speak directly by way of the coupled calls.

9. The method of claim 8 wherein the call is a telephone call.

10. The method of claim 8 wherein the called party is a funeral professional and the calling party is a client calling the funeral professional regarding obtaining funeral services for a deceased.

11. The method of claim 8 wherein the called party is a funeral professional, the calling party is a client calling the funeral professional regarding obtaining funeral services for a deceased, and the triggering point is when the agent determines that the calling party is initially calling regarding the deceased.

12. The method of claim 8 wherein the received signal from the agent at the triggering point is provided by way of an actuation device on the display actuated by the agent.

13. The method of claim 8 further comprising: identifying the called party based on the answered incoming call; obtaining a script associated with the identified called party from a database associated with the computing system; running the obtained script to display questions to an agent at a display associated with the computing system and to gather answers from the calling party based on the displayed questions, the questions and answers relating to a purpose of the incoming call from the calling party, the received signal from the agent at the triggering point being received prior to an ending of the script.

14. The method of claim 8 further comprising receiving a signal from the agent to disconnect out of the coupled calls once the calling party and the called party are speaking by way of the coupled calls.

* * * * *